United States Patent [19]
Keith

[11] Patent Number: 5,346,051
[45] Date of Patent: Sep. 13, 1994

[54] QUICK CHANGE-OVER PALLET SYSTEM

[75] Inventor: Malcolm E. Keith, West Chicago, Ill.

[73] Assignee: Midaco Corporation, Elk Grove Village, Ill.

[21] Appl. No.: 98,930

[22] Filed: Jul. 29, 1993

[51] Int. Cl.⁵ .............................................. B65G 37/00
[52] U.S. Cl. .................................. 198/346.1; 29/33 P; 198/465.3
[58] Field of Search ............... 198/346.1, 465.1–465.3; 29/33 P

[56] References Cited

U.S. PATENT DOCUMENTS

| | | | |
|---|---|---|---|
| 4,172,512 | 10/1979 | Clegg et al. | 198/346.1 |
| 4,423,806 | 1/1984 | Ogasawara | 198/346.1 |
| 4,705,445 | 11/1987 | Morita et al. | 198/346.1 |
| 4,717,306 | 1/1988 | Satake | 198/346.1 |
| 4,718,810 | 1/1988 | Hoehn et al. | 198/346.1 |
| 4,832,170 | 5/1989 | Takeuchi et al. | 198/346.1 |
| 5,099,981 | 3/1992 | Guzzoni | 198/346.1 |
| 5,158,487 | 10/1992 | Varnau | 29/33 P |
| 5,172,804 | 12/1992 | Chersin | 198/346.1 |

*Primary Examiner*—Joseph E. Valenza
*Attorney, Agent, or Firm*—Hill, Steadman & Simpson

[57] ABSTRACT

A pallet system for changing pallets at a work station which has a carousel mounted on a base and has a trolley laterally moveable which supports a turntable that is rotatably moveable. Pallets which hold workpieces are mounted to rails on the turntable. Locking devices for the trolley, the turntable and the pallets are provided. Pivoted rails allow the pallets to be moved between the carousel and the work station.

10 Claims, 4 Drawing Sheets

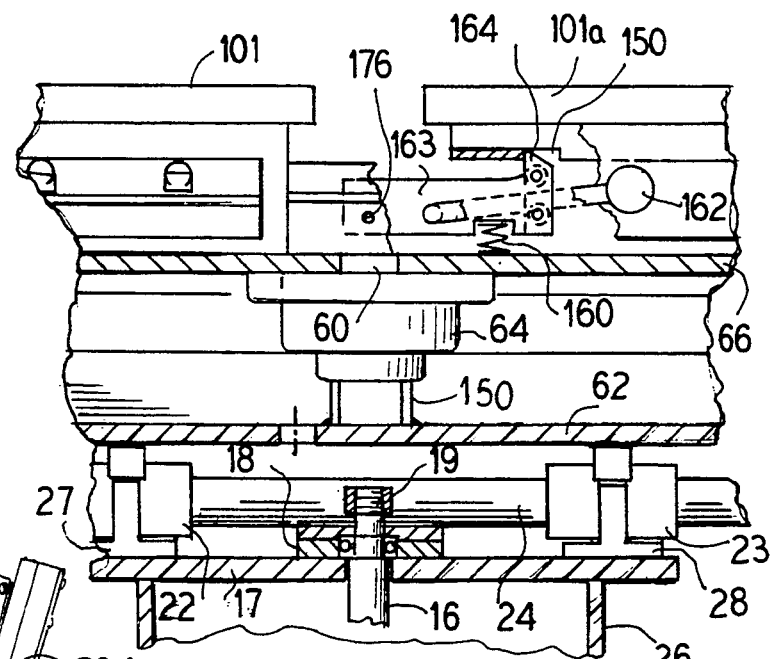
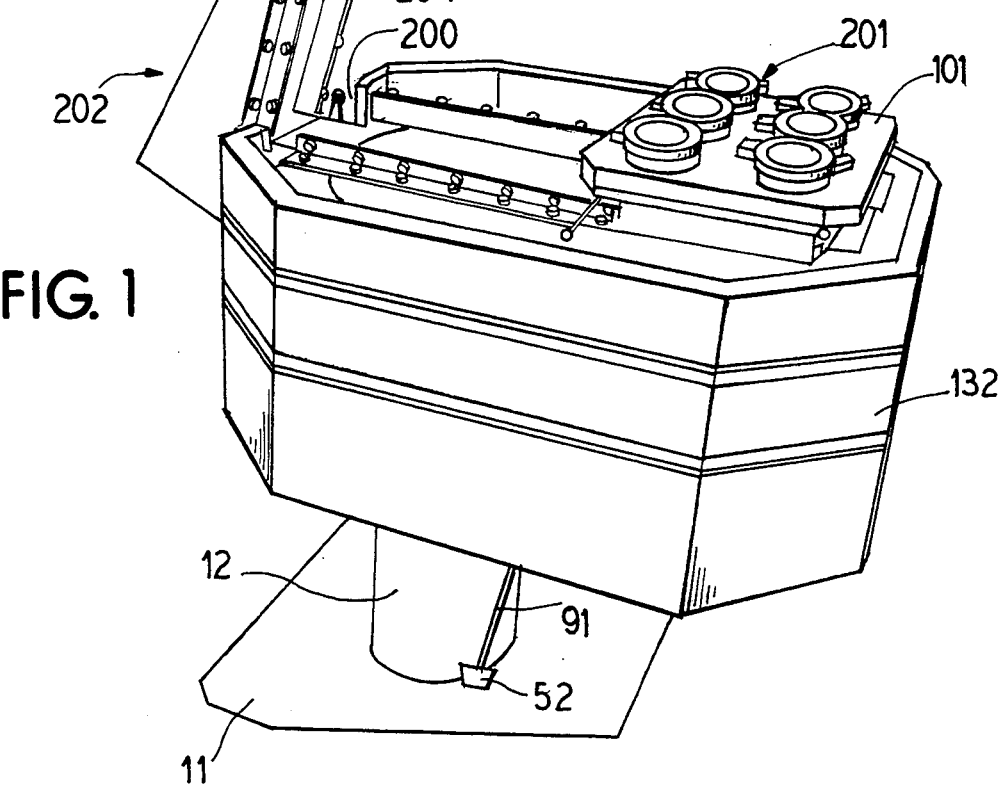

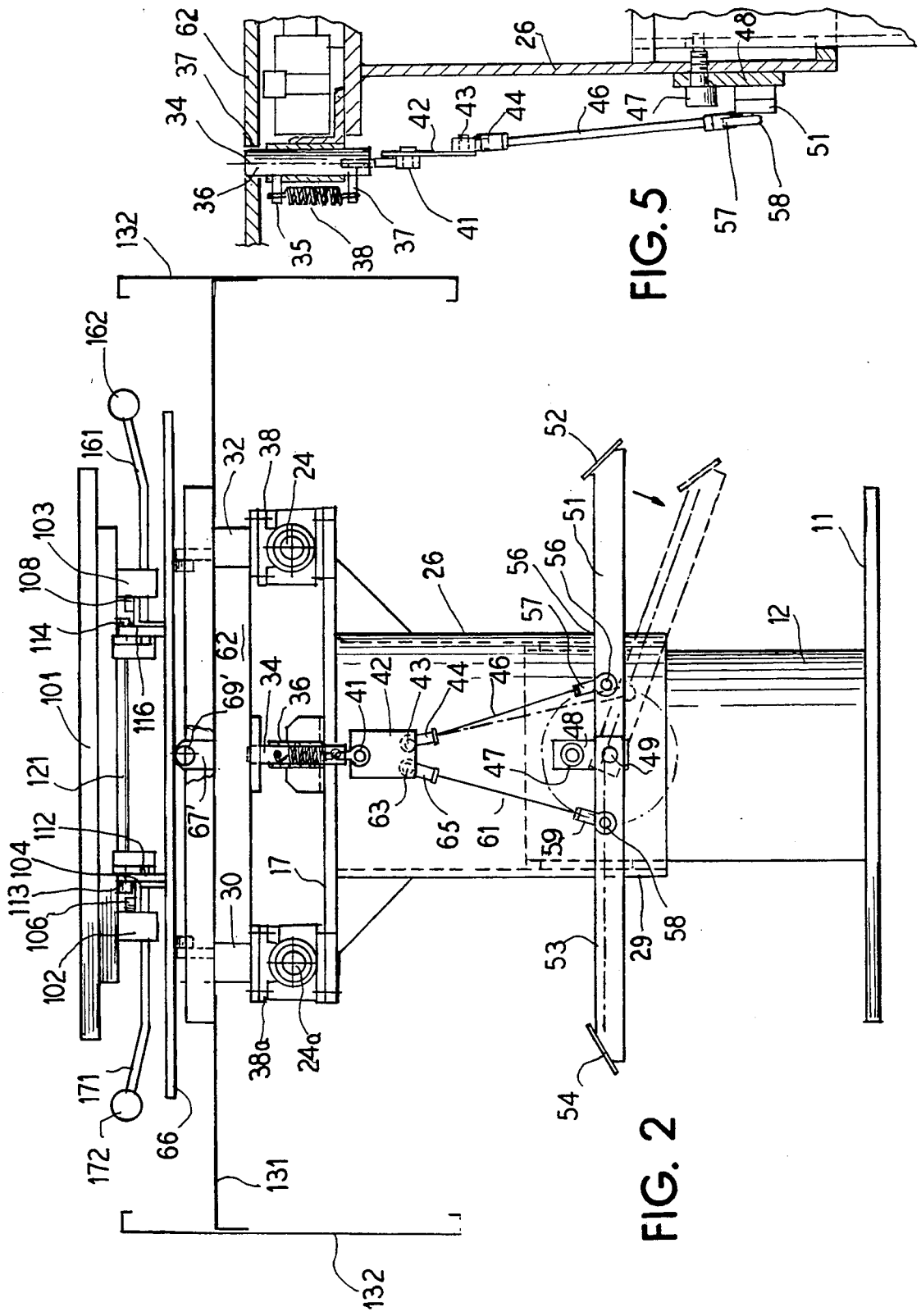

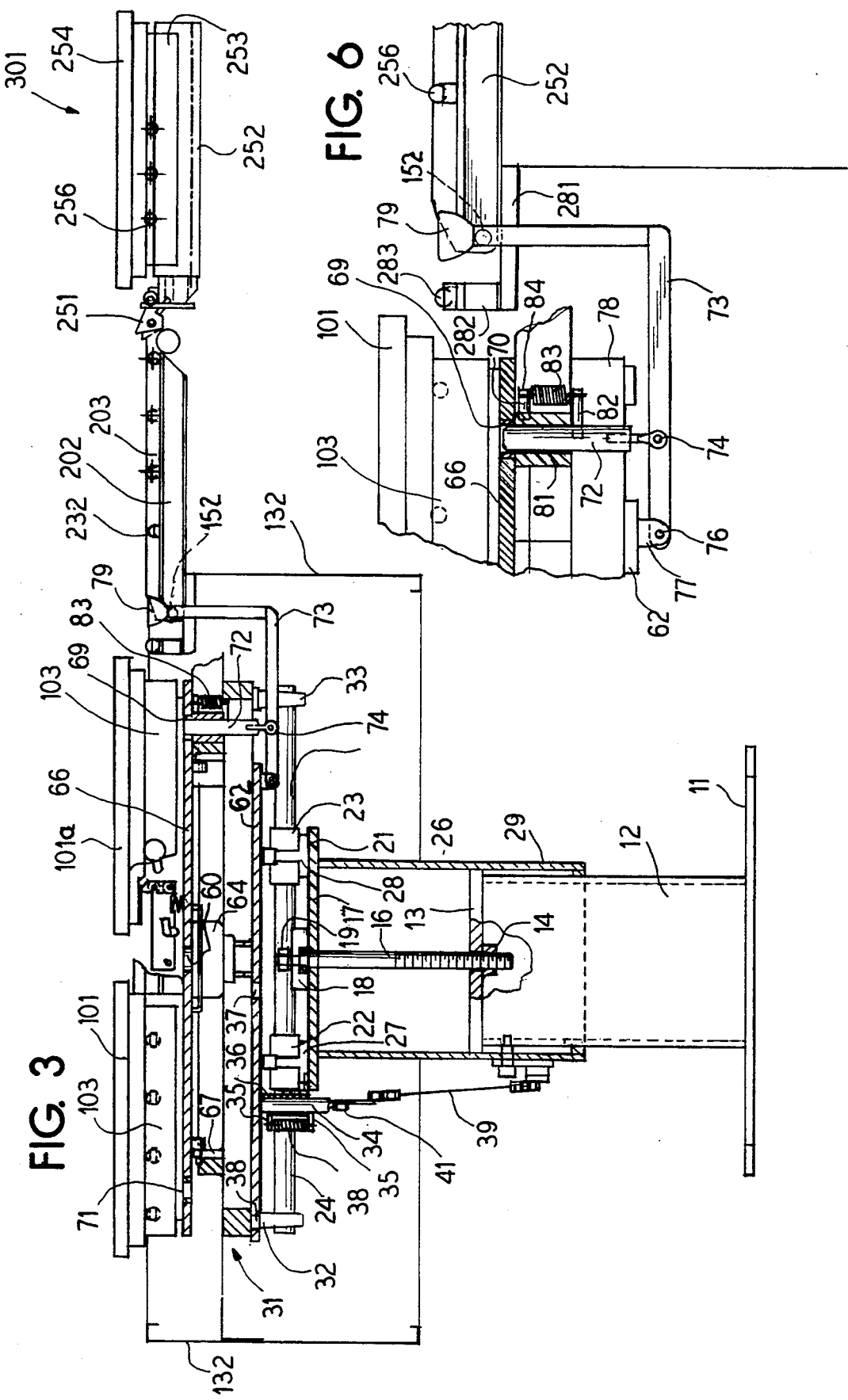

QUICK CHANGE-OVER PALLET SYSTEM

BACKGROUND OF THE INVENTION

1. Field of the Invention

This invention relates in general to a quick change-over pallet system for maximizing the productivity of machine centers and in particular to a system that allows pallets to be switched very rapidly.

2. Description of Related Art

Conventionally when parts are to be machined, they are individually mounted on the bed of the machine for the machining operation. This involves lots of set-up time and adjustment of the machining tools and parts to be machined by the operator and is time consuming, since each individual part must be setup.

SUMMARY OF THE INVENTION

It is an object of the present invention to provide a quick change-over pallet system wherein parts which are to be machined are mounted on pallets. For example, a number of parts may be mounted on a single pallet and be simultaneously machined by multiple machine tools because the parts are indexed for each machine on the pallet.

It is an object of the present invention to provide a quick change-over pallet system for machining centers wherein parts to be machined are pre-mounted on a pallet and placed on the quick change-over apparatus of the invention during the time that the machining center is processing the workpieces on a pallet. The invention comprises a moveable pallet storing and support device that allows one or more pallets to be pre-mounted on the support device and which can then be moved and supplied to the machining center on supporting rails. While the machining is being accomplished, one or more additional pallets with workpieces can be mounted on the apparatus of the invention so that they can be supplied to the machine after the present machining has been completed.

It is seen that the present invention has the following advantages. It allows quick changes to be made so that the pallets can be switched very quickly such as in sixty seconds. An easy to flip handle locks down the pallets. The parts can be loaded and unloaded off-line so as to change parts, setup, clean chips and inspect off-line while alternate pallet is in the machine.

The invention maximizes productivity and doubles and even triples spindle up-time and improves the machine output.

The invention eliminates down-time since first article inspection can be done off-line while an alternate job is in the machine.

Jobs can be easily switched so as to interrupt long runs with short runs or emergency jobs.

The setup costs are reduced since inexpensive pallets can be dedicated to repeat jobs and stored between uses. The carousel of the invention allows operator access to be maximized and is capable of being moveable to and from the machine. The accuracy can be repeated within very close tolerances.

It is a feature of the present machine to provide a carousel capable of holding one or more pallets with machine parts mounted thereon which has a rotary table that is mounted on guide rails so that it can be moved laterally to load and unload pallets onto the machining center. The rotary table can be rotated 180°. Pallet supports are provided on the rotary table so as to moveably support pallets. The pallets can be locked to the pallet supports and a rotary table can be locked and the rotary table can also be locked on the guide rails.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a perspective view of the change-over pallet system, carousel of the invention;

FIG. 2 is a partially cut-away end plan view of the invention;

FIG. 3 is a partially cut-away plan view of the invention at right angles to FIG. 2;

FIG. 5 is a partially cut-away sectional view illustrating the locking mechanism for locking the rotary table on the guide rails;

FIG. 6 is a partially cut-away sectional view illustrating the locking mechanism for the rotary table; and FIG. 7 is a partially cut-away view illustrating the lock for the pallets on the pallet support.

DETAILED DESCRIPTION OF THE PREFERRED EMBODIMENTS

Figure 4:
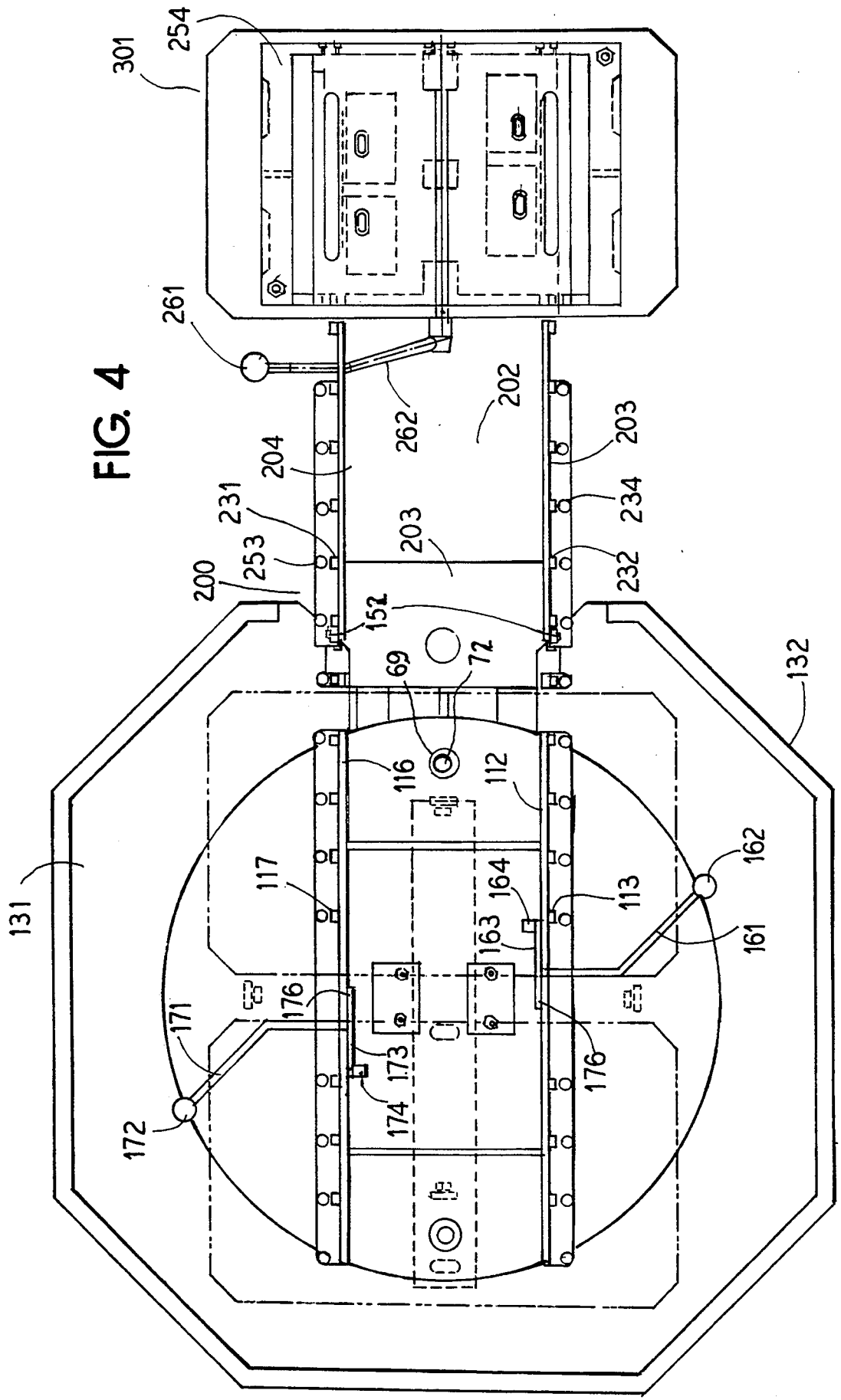
FIG. 4 is a top plan view of the invention.

FIGS. 1, 2 and 3 illustrate a base plate 11 which is mounted on a suitable surface as, for example, a floor. An upwardly extending support member 12 supports the carousel of the invention. A downwardly extending hollow member 26 fits over the support member 12 as shown in FIGS. 2 and 3 and its bottom portion 29 overlaps the top portion of the support member as shown. A top plate 17 is attached to the top of member 26 and a bolt 16 extends from the top plate 17 of member 26 to the top plate 13 of lower support member 12. The bolt 16 has a head 19 which is rotatably supported by a bracket 18 that has bearings therein and the member 18 is attached to the plate 17. A nut 14 is attached to the plate 13 as, for example, by welding and threadedly receives the lower end of the bolt 16. By rotating the head 19 of the bolt 16, the space between the plates 17 and 13 can be adjusted during initial setup of the machine.

Moveably mounted on the plate 17 are a pair of guide rails 24 and 24a as shown in FIGS. 2 and 3. Brackets 27 and 28 are mounted on the plate 17 and are provided with bearing support members 22 and 23 which slidably receive the rails or shafts 24 and 24a. The trolley 62 is mounted on the shafts 24 and 24a by brackets 32 and 33. The trolley 62 supports the rotary table 31.

A locking pin 34 is slidably mounted in a cylindrical support 36 attached to plate 17. The locking spring 34 is receivable in openings 38 or 37 formed in trolley plate 62 so as to lock the trolley 62 in at least two selectable positions relative to the support plate 17. The locking pin 34 is shown in detail in FIG. 5 and extension of pin 34, 37 is connected to a spring 38 which has its other end connected to a bracket 35 mounted on sleeve 36 so as to bias the locking 34 in the upward direction. A plate 42 is connected to the lower end of locking pin 34 by a pivot pin 41. The lower end of bracket 42 is connected by pivot pins 43 and 63 to connectors 44 and 65 which are, respectively, connected to rods 46 and 61. The lower end of rod 46 is connected to a connector 57 which is connected to a pivot pin 56 which pivotably connects it to a petal 51 which is pivotally supported by pivot pin 49 on a bracket 48 which is connected by bolt 47 to the support member 26. The petal 51 has a foot pad 52 for use from the right side relative to FIG. 2 so as to unlock the locking pin 34. The rod 61 is connected to a connector 59 which is connected by a pivot pin 58 to a second petal 53 supported by pivot 49 which extends to the left relative to FIG. 2 and which has a foot pad 54. The petals 51 and 53 allow the locking pin 34 to be moved downwardly to unlock the trolley 62 relative to the plate 17 from either side of the machine so that the trolley can be moved to the left or right relative to FIG. 3.

As best shown in FIGS. 2, 3 and 7, a support shaft 150 is supported from trolley 62 and carries a bearing 64 which rotary supports a plate 66 of rotary table 31. A locking pin 72 is moveable supported from trolley 62 and moves in sleeve 81. A bracket 77 is connected by a pivot pin 76 to trolley 62 and to a lever 73 which has a handle 79. The lower end of locking pin 72 is pivoted to the lever 73 by a pivot pin 74. A spring 83 is connected between an extension 82 of the locking pin 72 and an extension 70 which is fixed to the sleeve 81 so as to bias the locking pin 72 in the up direction. Locking pin 72 is receivable in opening 69 or opening 71 formed in the plate 66 of the rotary table 31 so as to lock it in angular positions which vary by 180°.

The pallet support plate 66 of the rotary table 31 supports rail members 112 and 116 on the top of which are rotatably mounted a plurality of rollers 113 and 114 for supporting a pallet 101. The pallet 101 has two downwardly extending sides 102 and 103 which engage horizontal rollers 106 and 108 rotatably supported by the members 112 and 116 such that the pallet 101 rides on a plurality of rollers 113 and 114 which support the weight of the pallet 101 and the guide rollers 106 and 108 control the lateral position of the pallet 101 relative to FIG. 2, for example. As shown in FIGS. 1, 3 and 7, two pallets such as 101 and 101 a can be mounted on the rail member 112 and 116 and locking handles 161, 171 with hand holds 162 and 172 are provided on the locking handles 161 and 171 and, respectively, operate locking levers 163 and 173 which are respectively mounted on rail support members 112 and 116 as illustrated in FIGS. 4 and 7. The locking members 163 and 173 are connected by pivot pins 176 and 174 to the rail members 112 and 116. Locking pawl 164 extends from locking lever 163 as illustrated in FIG. 4 and a spring 160 is mounted between plate 66 and member 163 to bias the locking pawl upwardly so that it will be received in a notch 150 in the pallet 101 a to lock the pallet 101 a on the rails 112 and 116. The handle 162 can move the pawl 164 downwardly so that the pallet 101a is unlocked so that it can move relative to the rails 112 and 116.

The locking handle 172 controls the locking pawl 176 which is received in a notch, not shown in the pallet 101 to lock it in position.

As best shown in FIGS. 1, 3 and 4, a pair of rails 203 and 204 are pivotally attached to the plate 62. The rails 203 and 204 pivot about a pivot pin 152 which is supported by a bracket 190 which support the rails 203 and 204. A work station 301 is shown in FIGS. 3 and 4 supports a pallet 254 which is machined by the work station 301. A locking handle 261 connects to a locking lever 262 to lock the pallet 254 on the work station 301. The pallet 254 can be moved on the rails 203 and 204 to and from the carousel support of the invention and the end 251 of the rails 203 and 204 rest on the edge of the work station as shown in FIG. 3.

A protective housing 132 is connected to a horizontal support 131 connected to the support members 30 and 32 as shown in FIG. 2 and is formed with an opening 200 through which the pivoted rails 202 which comprise the rails 203 and 204 extend so that the pallets 101 and 101a can be moved to and from the work station 301.

In use, the workpieces 201 can be mounted on the pallets 101 and 101a and 254 and as the machining is accomplished at work station on the workpieces mounted on pallet 254, the workpieces on pallets 101 and 101a can be mounted so that they are prepared for machining after machining has been completed on the workpieces on pallet 254. Then the pallet 254 can be removed from the work station 301 by releasing the lock 261 and removing the pallet 254 from the work station 301. Then a pallet 101 can be moved on the rails 112 and 116 and the pivoted rails 202 comprising an individual rails 203 and 204 can be pivoted to the down position such as shown in FIG. 3 so that the pallet 101a can be moved to the work station 301 where it can be locked in position by handle 261 so that machining can be accomplished at the work station 301. The rotary table 66 can be rotated to positions 180° apart so as to allow either pallet 101 or pallet 101a to be moved onto and off of the rails 203 and 204. The shafts 24 and 24a allow the rotary table which is mounted on plate 62 to be moved laterally relative to the base 11 and locked in one of two or more positions by releasing the locking pin 34 with petals 52 and 54.

The invention allows pre-mounting of workpiece 201 on pallets and the pallets can be moved on the carousel and to the work station 301.

Although the invention has been described with respect to preferred embodiments, it is not to be so limited as changes and modifications can be made which are within the full intended scope of the invention as defined by the appended claims.

I claim as my invention:

1. A quick change pallet system comprising, a base, first rail guides mounted on said base, a trolley structure with a pair of parallel rails attached to its lower surface which are receivable in said rail guides, first locking means for locking said trolley structure relative to said base, a turntable rotatably mounted on said trolley, second locking means for locking said turntable relative to said trolley, and a second pair of rails mounted on said turntable and a pallet mounted on said second pair of rails.

2. A quick change pallet system according to claim 1 including third locking means for locking said pallet on said second pair of rails.

3. A quick change pallet system according to claim 2 including at least one additional pallet mounted on said second pair of rails.

4. A quick change pallet system according to claim 3 including fourth locking means for locking said additional pallet to said second pair of rails.

5. A quick change pallet system according to claim 1 including a third pair of rails pivotally connected to said trolley and aligned with said second pair of rails such that when said third pair of rails are pivoted to a horizontal position said pallet can be moved between said second and third pair of rails.

6. A quick change pallet system according to claim 5 including a work station with a fourth pair of rails aligned with said third pair of rails so that said pallet can be moved between said third and fourth pair of rails.

7. A quick change pallet system according to claim 6 including fifth locking means for locking said pallet to said third pair of rails.

8. A quick change pallet system according to claim 5 including a housing connected to said trolley structure and formed with an opening adjacent said third pair of rails.

9. A quick change pallet system according to claim 1 wherein said first locking means comprises a plurality of openings formed in said trolley means, and a first moveable locking pin mounted on said base and receivable in said openings.

10. A quick change pallet system according to claim 1 wherein said second locking means comprises a second plurality of holes formed in said turntable and a second moveable locking pin mounted on said trolley structure and receivable in said second plurality of holes in said turntable.

* * * * *